May 8, 1962
R. ADELL
3,033,404
DEVICE FOR HOLDING ADDITIVE FOR MOTOR
VEHICLE WINDSHIELD WASHING LIQUID
Filed April 3, 1961
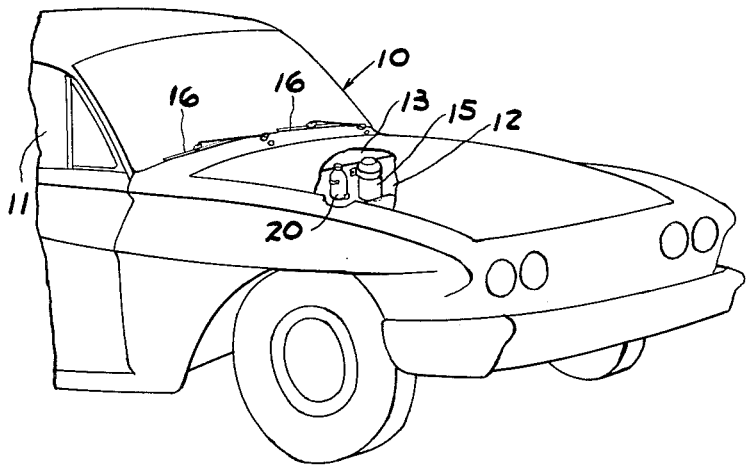
Fig.1
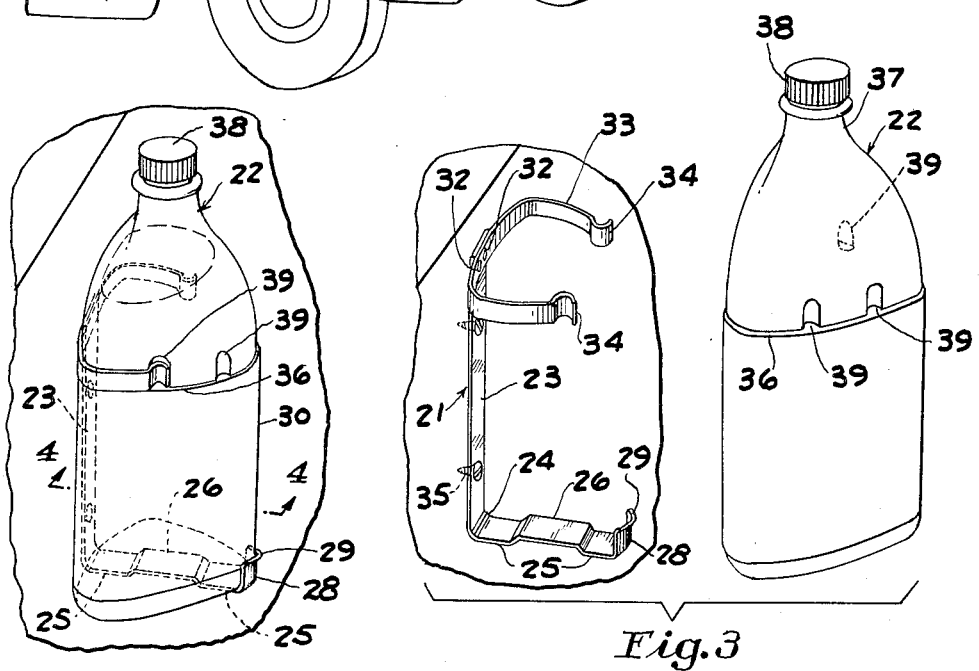
Fig.2
Fig.3
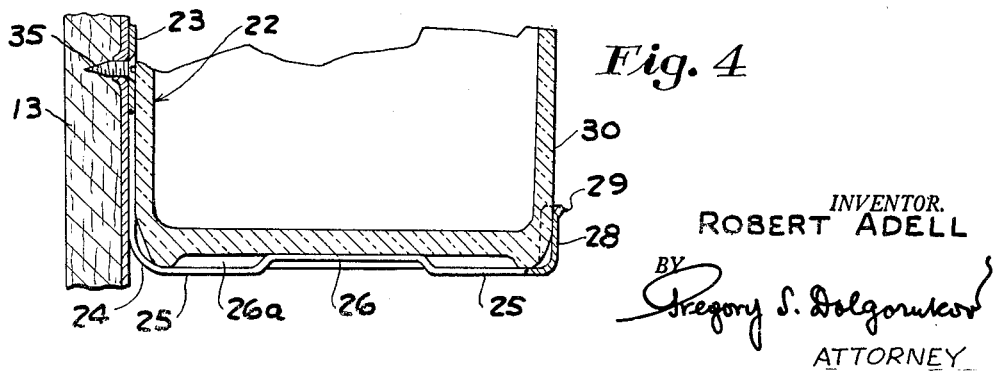
Fig. 4
INVENTOR.
ROBERT ADELL
BY
Gregory S. Dolgorukov
ATTORNEY

United States Patent Office 3,033,404
Patented May 8, 1962

3,033,404
DEVICE FOR HOLDING ADDITIVE FOR MOTOR VEHICLE WINDSHIELD WASHING LIQUID
Robert Adell, Detroit, Mich., assignor to Adell Chemical Corporation, Detroit, Mich., a corporation of Michigan
Filed Apr. 3, 1961, Ser. No. 100,203
3 Claims. (Cl. 215—1)

This invention relates to motor vehicles, and more particularly to an improved device for storing therein additive for the liquid used in windshield washer mechanisms of such vehicles. The present application is a continuation-in-part of my co-pending application Serial No. 828,289 filed July 20, 1959, for Device for Holding Additive for Windshield Washing Liquid.

The advantages of the device disclosed in my co-pending application above referred to have been fully realized in a large number of motor vehicles of various types. However, it was found that some motor vehicles and their engine compartments are of such construction and have such distribution of various parts and engine accessories as to leave virtually no free wall or support space where my device can be properly installed. It was taken, therefore, by many would-be users of my device that their motor vehicles are not suitable to have a device of this nature conveniently and properly installed therein. As a result, many such potential users have been deprived of the convenience and advantages afforded by my device.

One of the objects of the present invention is to provide an improved holder for the device for storing additive for windshield washing liquid whereby the above difficulties and disadvantages are overcome and largely eliminated without introducing new problems or increasing in any appreciable manner the costs involved.

Another object of the invention is to provide an improved holder of the above nature which may be installed under the engine hood of almost any motor vehicle, utilizing whatever available space may be found therein and irrespective of the fact whether, after being installed, the bottle holding the additive is in a vertical, inclined or horizontal position, or even disposed upside down.

A further object of the present invention is to provide an improved holder of the nature specified above which holds the bottle for the additive in a secure and resiliently tight manner irrespective of the position of such bottle, and with the use of which the bottle can be easily taken out and returned to its place in the holder.

A further object of the present invention is to provide an improved holder of the above nature which is simple and rugged in construction, dependable in operation and is relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 1 is a fragmentary perspective view illustrating the front portion of a motor vehicle having a device embodying the present invention installed within its engine compartment.

FIG. 2 is a perspective view of the device for holding additive, said device being shown separately.

FIG. 3 is an exploded perspective view showing the glass bottle or container and its supporting bracket, with said bottle and said bracket being separated from each other.

FIG. 4 is a fragmentary sectional view taken in the direction of the arrows on the vertical section plane passing through the section line 4—4 of FIG. 2, i.e. on the vertical section plane passed through the axis of the bottle.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In the drawing there is shown, by way of example, a device embodying the present invention. Referring specifically to FIG. 1, there is shown therein a portion of a motor vehicle generally designated by the numeral 10 and including a passenger compartment 11 and an engine compartment 12. A partition or fire wall designated by the numeral 13 is provided between said compartments 11 and 12 for separating the same. A washing liquid jar or container 15 is permanently mounted in a manner well known in the art on said partition 13 and is adapted to hold a quantity of washing liquid to be delivered by a pump (not shown) to the nozzles, when the pump is manually actuated, to squirt such liquid on the outside surface of the windshield, thus engaging the windshield wipers 16 to rub off any dirt that may accumulate on the surface of the windshield.

In accordance with the invention, my improved device generally designated by the numeral 20 is mounted adjacent to the container or jar 15. Therefore, it can be easily reached and used in connection with the jar 15 without the necessity of the filling station attendant walking around the vehicle and reaching into the glove compartment of the vehicle, for which operation opening the right-hand door or lowering the window is necessary or asking the vehicle operator to get such bottle out of the glove compartment and handing it over. For the latter operation the vehicle operator must either move to the right in the front seat or reach far to the right to open such compartment and to locate the bottle.

Referring to FIGS. 2–4, my improved device illustrated therein comprises a holding bracket generally designated by the numeral 21, made of spring material such as spring steel, and a container or bottle 22 made preferably, but not necessarily, of glass. The bottle 22 has been described in detail in my co-pending application above referred to, and, therefore, it is described herein only to the extent necessary for a proper understanding of the present invention.

The holding bracket 21 comprises a vertical strip 23 having its lower end bent at a right angle as shown at 24 to provide a bar 25 adapted to engage and to support the bottle 22 at its bottom. A raised portion 26 is provided on the bar 25 and because of its extending upwardly it enters into the depression or recess 26a provided at the under surface of the bottle 22 as is best shown in FIG. 4. The free end of the bar 25 is turned upwardly to provide a lug 28 adapted to engage from the bottom and from both sides the corner 30 of the bottle. The top edge 29 of the lug 28 is flared out as shown in the drawing to facilitate insertion of the bottle into the bracket 21. It should be noted that a substantial radius, such as ⅜″, is provided at 24 in order to clear properly the bead provided around the bottom of the bottle and to ensure proper resiliency of the bracket at that particular location and to permit its repeated bending without origination of cracks and final failure of the material.

The upper end of the vertically extending strip 23 has secured thereto in any suitable manner, such as with the aid of rivets 32, a C-shaped clip 33. The free ends of the C of the clip 33 are provided with inwardly extending rounded ends 34 for the purposes of engaging the bottle 22 in a manner explained below. A number of suitable holes are provided in the strip 23 for securing the bracket 21 to the partition 13 or any other suitable place with the aid of suitable connectors, such as self-tapping screws 35. Such screws may engage the supporting structure at prepunched or drilled holes.

The bottle 22 has a triangular cross section with its corners rounded on approximately 1″ radius. By virtue of such a construction my container provides an exceedingly convenient and strong hold for the hand without the necessity of exerting strong finger pressure. A shoulder 36 is provided around the upper portion of the bottle and at such location from the bottom thereof that the lower edges of the clip 33 bear thereon and prevent the bottle from moving upward, as it would have a tendency to do unless restrained, when the vehicle's wheels hit uneven spots on the road. If the bottle 22 is arranged in a horizontal position longitudinally of the car motion, the clip 33 bearing on the shoulder 36 and the bar 25 bearing on the bottom of the bottle resiliently restrain the bottle from moving longitudinally of the vehicle. If, for any reason, it becomes necessary to install the bracket 21 to hold the bottle 22 in an upside down position, the clip 33 supports the weight of the bottle.

At its top, the bottle is reduced to provide a round throat 37 the top of which is adapted to receive a screw-on cap 38. The cap 38 is adapted, when tightened, to seal the bottle and to prevent any leakage of the contents thereof irrespective of the position of the bottle.

On each of the three sides of the bottle and immediately adjacent the shoulder 36 thereof there are provided at equal distances from the corners of the bottle two depressions 39 adapted to receive the rounded ends 34 of the C-shaped clip 33. From an examination of FIGS. 2 and 3 it will be understood that when the bottle is in place, only one of the depressions 39 on each of the two sides of the bottle is engaged by the rounded portions 34 provided on the ends of the clip 33, with the other depression remaining inactive. However, by the provision of two depressions each of its three sides, the bottle may be inserted in place with any of its three sides bearing against the strip 23 of the supporting bracket.

It will now be seen, in view of the foregoing, that in the mounted position of the bottle it is held both at its top and at its bottom and is restrained from movements in any direction. In such a position of the bottle, the bottom bar 25 of the bracket extends under the bottom of the bottle substantially along the median line of its triangular sectional outline, i.e. from the middle of the side of its triangular outline in contact with the strip 23 to the rounded vertex of such outline, turning upwardly thereat to engage the corner of the bottle, as is best shown in FIG. 2.

From actual experience and extensive tests, it has been found that a supporting bracket, such as disclosed herein, particularly when made of spring steel of approximately $\frac{1}{32}$″ thick, has an exceedingly strong hold on the bottle, and such bottle will not come out of its bracket even if a rather strong jolt is exerted on it.

The bottle may be installed in virtually any practicable position, vertical, inclined, or horizontal, and, therefore, may be used in motor vehicles where no room for mounting a device in its upward vertical position is available.

On the other hand, the hold of my improved bracket on the bottle is such that the bottle can be taken out very easily with a twisting movement. Such removal is very easy, and instructions to that effect may be provided on the label of the bottle. To return the bottle to its place after use, the same is inserted into the bracket 21, with the movements reversed.

It will be understood that while the supporting bracket, such as 21, and the bottle, such as 22, have been referred to above as forming my improved device for holding additive for windshield washing liquid, such device is divisible in the sense that an automobile may be equipped with the supporting bracket, such as 21, and thus be adapted to receive a bottle, such as 22, of additive which can be purchased at any time later at a filling station. Thus, an automobile equipped with such supporting bracket is an improvement over conventional automobiles for the reasons explained above.

There is thus provided an improved device of the nature described whereby the objects of the present invention and numerous additional advantages are attained.

I claim:

1. A device for holding a supply of liquid additive for a windshield washer water container, said device comprising a bottle having a triangular cross section with rounded corners and a shoulder near its top, said bottle being provided with two depressions located at the upper portion of each of its three sides adjacent said shoulder at equal distances from the corners of the bottle; a bracket made of spring material adapted to receive and support said bottle and including an elongated strip, a C-shaped clip secured to the upper end of said strip, the ends of said clip being shaped to enter one depression on each of the two sides of the bottle, the lower end of the bracket strip being bent to support the bottle at the bottom and to press its shoulder against the C-shaped clip, with said lower end extending under the bottom of the bottle to the other side thereof and extending upwardly to provide an engaging lug.

2. The invention defined in claim 1, with said lower end extending all the way under the bottom of the bottle to the other side thereof and extending upwardly to overlie and engage for supporting the lower portion of one of the rounded corners of the bottle.

3. A device for holding a supply of liquid additive for a windshield washer water container, said device comprising a bottle having a triangular cross section with rounded corners and a shoulder near its top, said bottle having two depressions provided at the upper portion of each of its three sides at equal distances from the corners of the bottle; a bracket made of spring material and adapted to receive and support said bottle, a C-shaped clip secured to the upper end of said strip, the ends of said clip being shaped to enter the near depression, said bracket including a strip of resilient material adapted to be in contact with one of the three sides of the bottle and having its lower end bent at a substantially right angle and extending all the way under the bottom of the bottle substantially along the median of its cross sectional outline from the base of said outline to the vertex thereof and adapted to exert pressure on the bottom of the bottle to press its shoulder against said C-shaped clip, the extremity of said lower end being bent upwardly at said vertex to form a lug engaging the lower portion of the corner of the bottle opposite to the side thereof in contact with said strip, with said lug being shaped to embrace the corner from both sides.

References Cited in the file of this patent

UNITED STATES PATENTS

| | | |
|---|---|---|
| 2,052,466 | Heise et al. | Aug. 25, 1936 |
| 2,071,847 | Leppke | Feb. 23, 1937 |
| 2,147,758 | Schneider et al. | Feb. 21, 1939 |